US008166166B2

(12) United States Patent
Arroyo et al.

(10) Patent No.: US 8,166,166 B2
(45) Date of Patent: *Apr. 24, 2012

(54) APPARATUS SYSTEM AND METHOD FOR DISTRIBUTING CONFIGURATION PARAMETER

(75) Inventors: Jesse Paul Arroyo, Rochester, MN (US); Joseph Edward Bolan, Morrissville, NC (US); Thomas M. Brey, Cary, NC (US); Josep Cors, Rochester, MN (US); Gregory William Dake, Durham, NC (US); Scott Neil Dunham, Raleigh, NC (US); William Gavin Holland, Cary, NC (US); Theodore Brian Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1450 days.

This patent is subject to a terminal disclaimer.

(21) Appl. No.: 11/304,852

(22) Filed: Dec. 15, 2005

(65) Prior Publication Data

US 2007/0143480 A1 Jun. 21, 2007

(51) Int. Cl.
G06F 15/173 (2006.01)
(52) U.S. Cl. ........ 709/226; 709/220; 709/203; 709/218; 709/228
(58) Field of Classification Search .................. 709/226, 709/220, 203, 218, 228
See application file for complete search history.

(56) References Cited

U.S. PATENT DOCUMENTS

| 5,349,643 | A | 9/1994 | Cox et al. |
|---|---|---|---|
| 5,884,024 | A | 3/1999 | Lim et al. |
| 6,212,563 | B1 | 4/2001 | Beser |
| 6,697,868 | B2 | 2/2004 | Craft et al. |
| 6,728,875 | B1 | 4/2004 | Aguilar |
| 6,857,069 | B1 | 2/2005 | Rissmeyer |
| 6,922,722 | B1 | 7/2005 | Mann et al. |
| 7,127,602 | B1 | 10/2006 | Bakke et al. |
| 7,337,219 | B1 * | 2/2008 | Meenan et al. ............... 709/220 |
| 7,363,356 | B1 * | 4/2008 | Rissmeyer et al. ........... 709/220 |
| 7,403,987 | B1 | 7/2008 | Marinelli et al. |
| 2002/0120706 | A1 | 8/2002 | Murphy ....................... 709/208 |

(Continued)

FOREIGN PATENT DOCUMENTS

JP 2001186136 7/2001

(Continued)

OTHER PUBLICATIONS

Prasenjit Sarker, 'Status of iSCSI Boot,' http://www.ietf.org/proceedings/01dec/slides/ips-12/sId001.htm, slide 1-20.
'iSCSI Security SRP,' Real Storage website, 2004 Real Storage.
'iSCSI,' iSCSI=a Whatis.com definition p. 1-3, http://searchstorade.techtarget.com/gDefinition/0.294236.sid5_gci750136.00.html.

(Continued)

Primary Examiner — Lan-Dai Truong
(74) Attorney, Agent, or Firm — Kunzler Needham Massey & Thorpe (57) ABSTRACT

An apparatus, system, and method are disclosed for distributing configuration parameters. The present invention includes one or more storage devices configured to store data, a first DHCP server configured to process DHCP messages and redirect communications regarding configuration parameters for the storage devices to a second DHCP server, and a configuration datastore configured to store configuration parameters for the storage devices. The second DHCP server may be configured to process DHCP messages and retrieve configuration parameters for the storage devices from the configuration datastore. In certain embodiments, each storage initiator communicates with the DHCP servers, receives the configuration parameters such as iSCSI parameters, and provides the configuration parameters to one or more storage devices.

17 Claims, 7 Drawing Sheets

U.S. PATENT DOCUMENTS

| | | | |
|---|---|---|---|
| 2002/0161848 A1 | 10/2002 | Willman et al. | |
| 2002/0199205 A1 | 12/2002 | Sonawane et al. | |
| 2003/0005276 A1 | 1/2003 | French et al. | |
| 2003/0084209 A1 | 5/2003 | Chadalapaka | |
| 2003/0093541 A1 | 5/2003 | Lolayekar et al. | |
| 2003/0131182 A1 | 7/2003 | Kumar et al. | |
| 2003/0140210 A1 | 7/2003 | Testardi | |
| 2003/0191932 A1 | 10/2003 | Allen et al. | |
| 2004/0025052 A1 | 2/2004 | Dickenson | |
| 2004/0078521 A1 | 4/2004 | Hawks et al. | |
| 2004/0117438 A1 | 6/2004 | Considine et al. | |
| 2004/0162880 A1 | 8/2004 | Arnone et al. | |
| 2004/0177133 A1* | 9/2004 | Harrison et al. | 709/220 |
| 2004/0193683 A1 | 9/2004 | Blumofe | |
| 2005/0013441 A1 | 1/2005 | Klein | |
| 2005/0015459 A1 | 1/2005 | Gole et al. | |
| 2005/0015460 A1 | 1/2005 | Gole et al. | |
| 2005/0044162 A1 | 2/2005 | Liang et al. | |
| 2005/0138346 A1* | 6/2005 | Cauthron | 713/2 |
| 2005/0216421 A1 | 9/2005 | Barry et al. | |
| 2005/0216668 A1 | 9/2005 | Kobayashi et al. | |
| 2005/0249196 A1 | 11/2005 | Ansari et al. | |
| 2006/0015513 A1 | 1/2006 | Poyhonen et al. | |
| 2006/0085522 A1* | 4/2006 | Spry | 709/220 |
| 2006/0218252 A1* | 9/2006 | Ford | 709/220 |
| 2007/0180509 A1* | 8/2007 | Swartz et al. | 726/9 |
| 2009/0187645 A1* | 7/2009 | Hayden et al. | 709/220 |

FOREIGN PATENT DOCUMENTS

| | | | |
|---|---|---|---|
| JP | 2001189761 | | 7/2001 |
| JP | 2001230788 | | 8/2001 |
| JP | 2002009791 | | 1/2002 |
| JP | 2003324437 | | 11/2003 |
| JP | 2005244988 | | 9/2005 |
| WO | 0161904 | A1 | 8/2001 |
| WO | 2004044763 | | 11/2002 |
| WO | 2004038699 | | 5/2004 |
| WO | 2005099230 | | 10/2005 |

OTHER PUBLICATIONS

Duncan Missimer, 'Bootstrapping Clients using the ISCSI Protocol,' IP Storage Working Group Memo, p. 1-12.

David Black, 'iSCSI boot-DHCP Root Path Option,' Mailing List Archive-email.

Britt Bolen, This mini-HOWTO tries explains how to set up a . . . http://eludicate.com/~bolen/iscsi/, V2.0.1, Jan. 22, 2005.

'Industry's first native iSCSI tape libraries,' Library Feature, 4.1. iscsi.042003.

Bernard Adoba, 'I-D Action: draft-ietf-ips-iscsi-boot-09.txt,' Mailing List Archive-email, p. 1-4.

Office Action for U.S. Appl. No. 11/300,961 dated Apr. 2, 2010.

R. Droms, "RFC 2132—Dynamic Host Configuration Protocol", Mar. 1997.

S. Alexander et al., "RFC 2132—DHCP Options and BOOTP Vendor Extensions", Mar. 1997.

R. Droms et al., "RFC 3118—Authentication for DHCP Messages", Jun. 2001.

Ed Park, "Dual-Boot Linux and Windows 2000/Windows XP with GRUB HOWTO", http://web.archive.org/ web/20030412194011/ http://www.geocities.com/epark/linux/grub-w2k-HOWTO.html, Mar. 29, 2003.

Office Action for U.S. Appl. No. 11/300,999 dated Dec. 26, 2008.

Office Action for U.S. Appl. No. 11/300,999 dated Jun. 16, 2009.

Office Action for U.S. Appl. No. 11/300,999 dated Jan. 7, 2010.

"User Selectable Boot Process", IBM Technical Disclosure Bulletin vol. 38, No. 1, Jan. 1995, pp. 377-378.

"Unconditional Installation of Scsi Device Drivers", IBM Technical Disclosure Bulletin, vol. 37, No. 4a, Apr. 1994, pp. 153-154.

Office Action for U.S. Appl. No. 11/300,999 dated May 13, 2010.

PCT/EP2006069490 International Search Report and Written Opinion dated Jul. 5, 2007.

"Remote Supervisor Adapter II SlimLine and Remote Supervisor Adapter II: User's Guide", IBM, Fourth Edition, Sep. 2004 in Japanese and English.

* cited by examiner

APPARATUS SYSTEM AND METHOD FOR DISTRIBUTING CONFIGURATION PARAMETER

BACKGROUND OF THE INVENTION

1. Field of the Invention

This invention relates to systems, methods, and apparatus for delivering configuration parameters and more particularly relates to systems, methods, and apparatus for distributing configuration parameters for storage devices from one or more data stores of configuration parameters.

2. Description of the Related Art

Configuration parameters enable networking devices such as servers and storage devices to communicate with one another according to a specific networking protocol such as dynamic host configuration protocol (DHCP) or internet small computer system interface (iSCSI). In some environments, before a first networking device may begin communicating with a second networking device, the first networking device must obtain the configuration parameters necessary to initiate and maintain a connection. Though methods exist for delivering the necessary configuration parameters to a networking device, the currently available configuration parameter delivery methods suffer from a variety of deficiencies.

One currently available configuration parameter delivery method includes manually entering the configuration parameters into each networking device. Accordingly, if a network includes tens or hundreds of networking devices that require networking protocols, a user, network administrator, networking engineer, or the like, must manually enter the networking protocols in each of the tens or hundreds of networking devices. Though such a method accomplishes the necessary step of delivering configuration parameters to the networking devices, manual entry is time consuming, tedious, and vulnerable to human error.

Another currently available configuration parameter delivery method includes delivering configuration parameters from a centralized location, but in an ad-hoc manner. Accordingly, a user, network administrator, or networking engineer delivers configuration parameter to a networking device from a computer station, but must discover or implement an entirely new or substantially different configuration parameter delivery method for different types of networking devices or groups of networking devices.

Though this semi-automated method for delivering configuration parameters is more automated than the foregoing, fully manual approach, this semi-automated approach requires an ad-hoc delivery method for different networking devices as each networking device may require different configuration parameters or a unique configuration parameter delivery method. Additionally, such manual and semi-automated distribution methods fail to provide the flexibility of centralized or decentralized control as desired.

Other issues include the ability of configuration delivery systems to control initiator and target relationships such as those involved in iSCSI devices and the ability to recover from unsuccessful initialization of a device. From the foregoing discussion, it should be apparent that a need exists for an apparatus, system, and method for robust configuration parameter distribution. Beneficially, such an apparatus, system, and method would greatly reduce the labor and time required to deliver configuration parameters by operating on a fully automated and centralized manner in addition to providing centralized or decentralized control as desired.

SUMMARY OF THE INVENTION

The present invention has been developed in response to the present state of the art, and in particular, in response to the problems and needs in the art that have not yet been fully solved by currently available solutions. Accordingly, the present invention has been developed to provide an apparatus, system, and method for receiving and utilizing configuration parameters that overcome many or all of the above-discussed shortcomings in the art.

In one embodiment, an apparatus for distributing configuration parameters is provided with a logic unit containing a plurality of modules configured to functionally execute the necessary steps of distributing configuration parameters. These modules in the described embodiments include a DHCP communication module that communicates with a first DHCP server. The DHCP communication module also directs communications regarding configuration parameters to a second DHCP server as indicated by the first DHCP server. The apparatus also includes a storage interface module that receives configuration parameters for a primary storage device provided by the second DHCP server and provides the configuration parameters to the primary storage device.

In some embodiments, the storage interface module may also provide configuration parameters to a secondary storage device in response to unsuccessful configuration of the primary storage device. In certain embodiments the configuration parameters are iSCSI parameters.

A system of the present invention is also presented for automated distribution of configuration parameters. The system may be embodied as a primary storage device configured to store data, a first DHCP server configured to process DHCP messages and redirect communications regarding configuration parameters for the primary storage device to a second DHCP server, and a configuration datastore configured to store configuration parameters for a plurality of storage devices. In certain embodiments, the second DHCP server processes DHCP messages and retrieves configuration parameters for the plurality of storage devices from the configuration datastore.

In certain embodiments, the system includes a storage initiator that retrieves the configuration parameters for the primary storage device from the second DHCP server and provides the configuration parameters to the primary storage device. In other embodiments, the system also includes a secondary storage device configured to store data. In some embodiments, the configuration datastore defines the primary and secondary target assigned to the storage initiator. In certain embodiments, the configuration parameters are iSCSI parameters and the storage initiator functions as an iSCSI initiator and the storage target functions as an iSCSI target.

A method of the present invention is also presented for distributing configuration parameters. The method in the disclosed embodiments substantially includes the operations necessary to carry out the functions presented above with respect to the operation of the described apparatus and system. In one embodiment, the method includes configuring a first DHCP server to direct communications regarding configuration parameters to a second DHCP server, configuring the second DHCP server to retrieve configuration parameters for a plurality of storage devices from a configuration datastore, and configuring a storage initiator to retrieve the configuration parameters for a primary storage device from the second DHCP server and provide the configuration parameters to a primary storage device.

The present invention provides for flexible automated delivery of configuration parameters. By redirecting communications from a first to a second DHCP server a variety of network topologies may be supported. For example, the first DHCP server may be a local server that redirects communication to a centralized second DHCP server to facilitate centralized control and delivery. Alternately the first DHCP server may be a centralized server that indicates an appropriate DCHP server for an initiator to communicate with in order to retrieve configuration parameters. Additionally, the ability to specify redundant targets for each initiator in the configuration datastore enables an initiator to recover from unsuccessful initialization of a primary storage target and initialize an appropriate secondary storage target.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
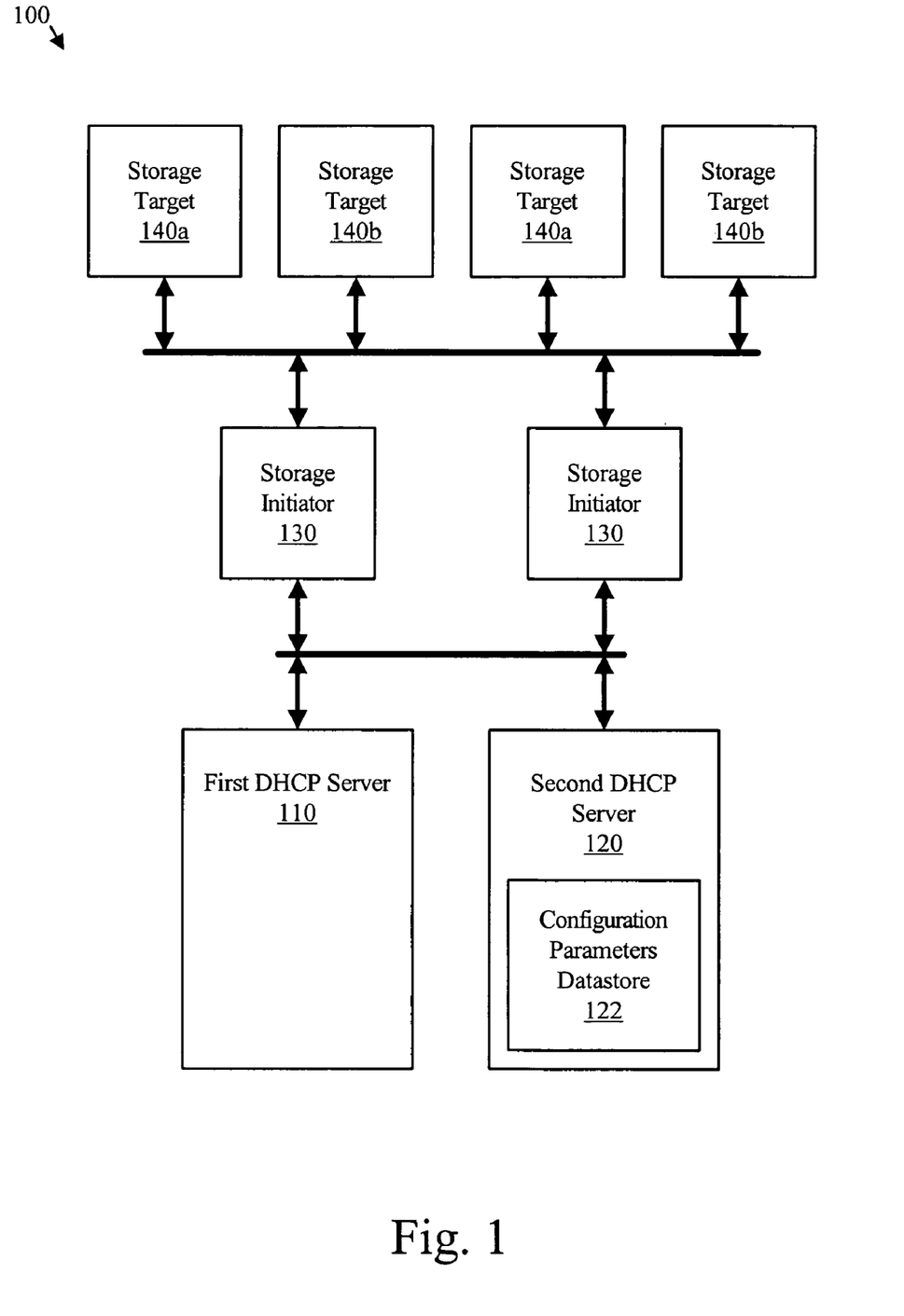
FIG. 1 is a schematic block diagram illustrating one embodiment of a parameter distribution system in accordance with the present invention.

FIG. 1 is a schematic block diagram of a parameter distribution system 100 in accordance with the present invention. The depicted system 100 includes a first dynamic host configuration protocol (DHCP) server 110, a second DHCP server 120, a configuration parameters datastore 122, one or more storage initiators 130, and one or more storage devices or targets 140. The various components of the system 100 function cooperatively to automatically distribute configuration parameters from a configuration parameters datastore 122.

The first and second DHCP servers 110, 120 process DHCP messages. Processing a DHPC message may include the first or second DHCP server 110, 120 sending or receiving DHCP messages. A DHCP message may include a variety of DHCP messages such as DHCP server discovery request from a storage initiator 130, a DHCP server offer, a storage initiator 130 configuration parameters request, and so on (see FIGS. 4-7).

Figure 4:
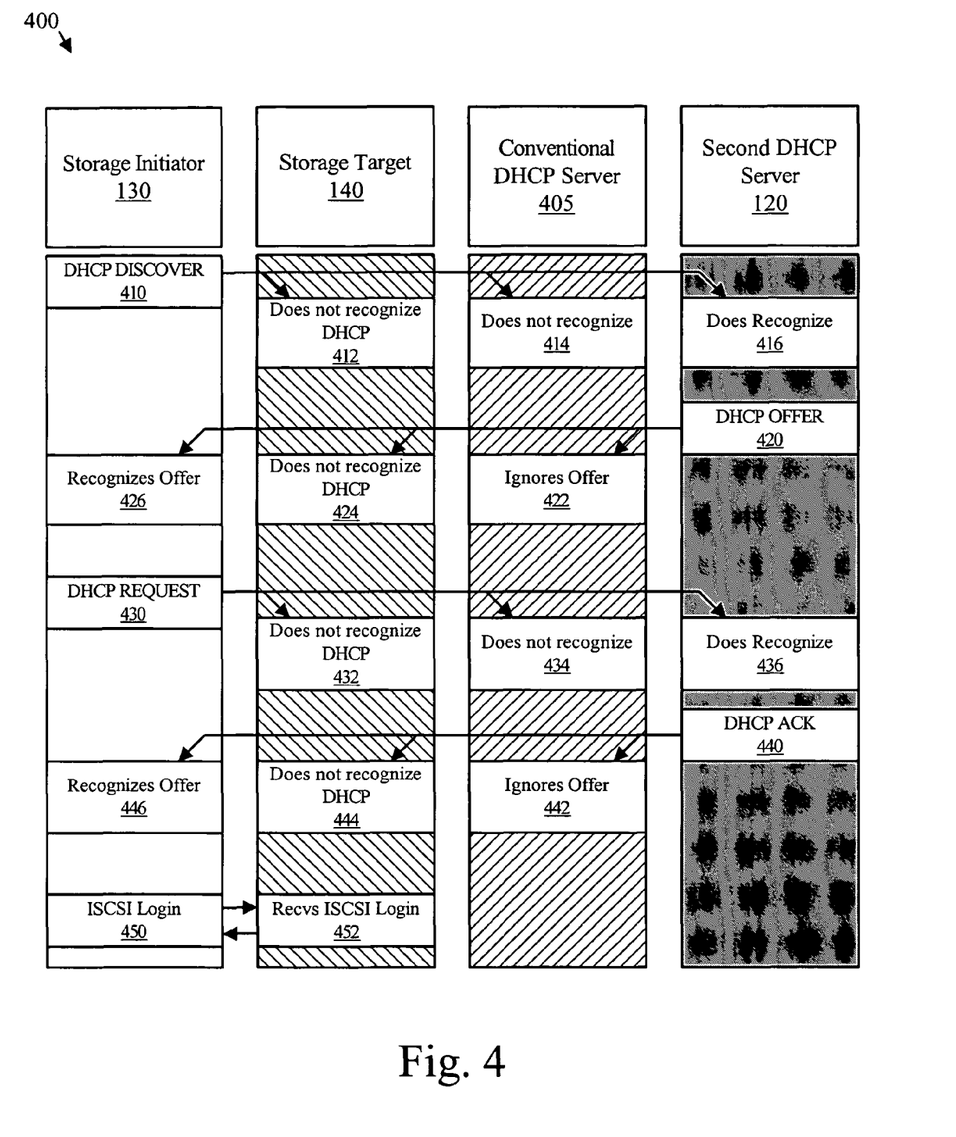
FIG. 4 is a schematic flow diagram illustrating one embodiment of a system communication sequence in accordance with the present invention.
Figure 5:
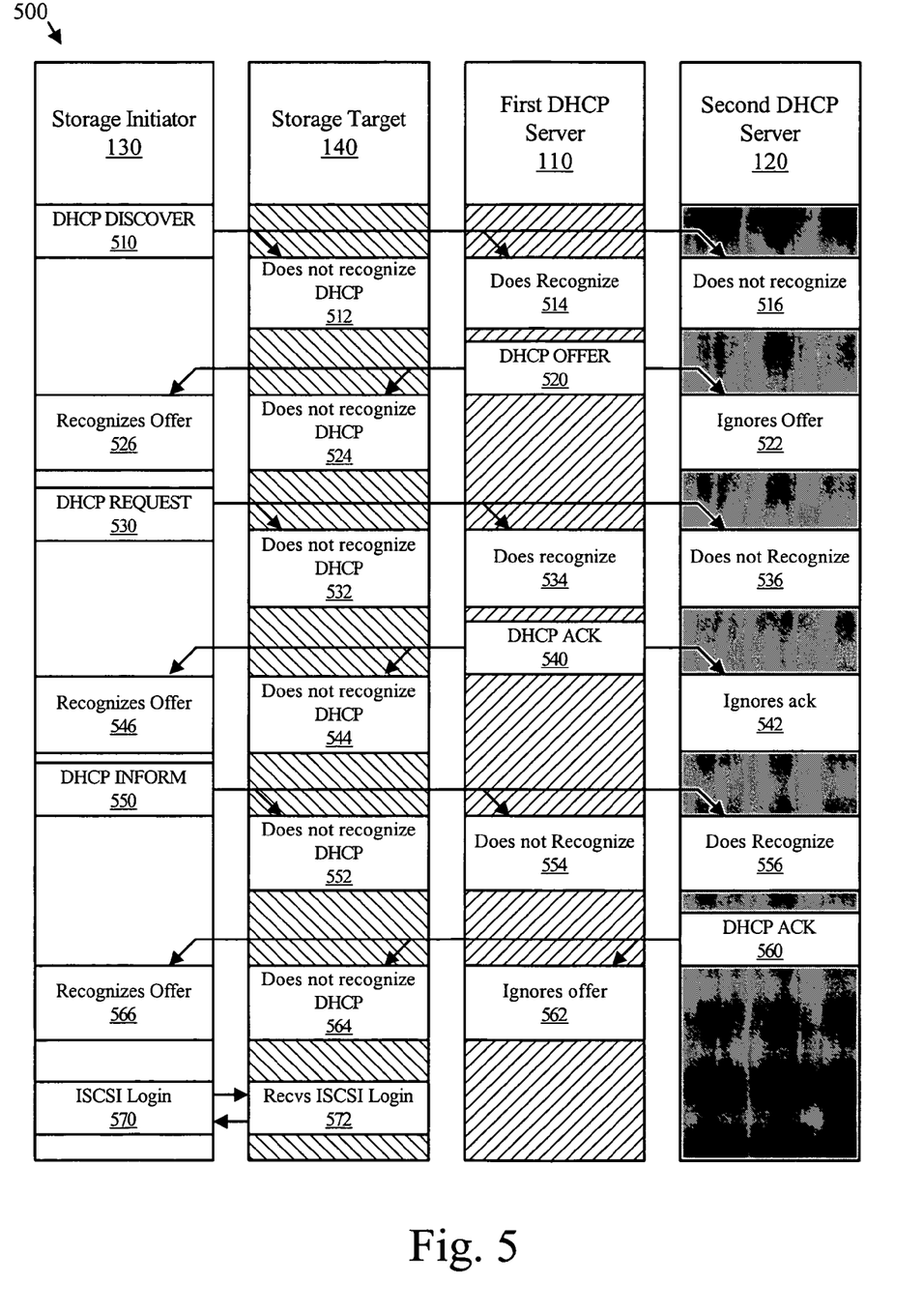
FIG. 5 is a schematic flow diagram illustrating one embodiment of a system communication sequence in accordance with the present invention.
Figure 7:
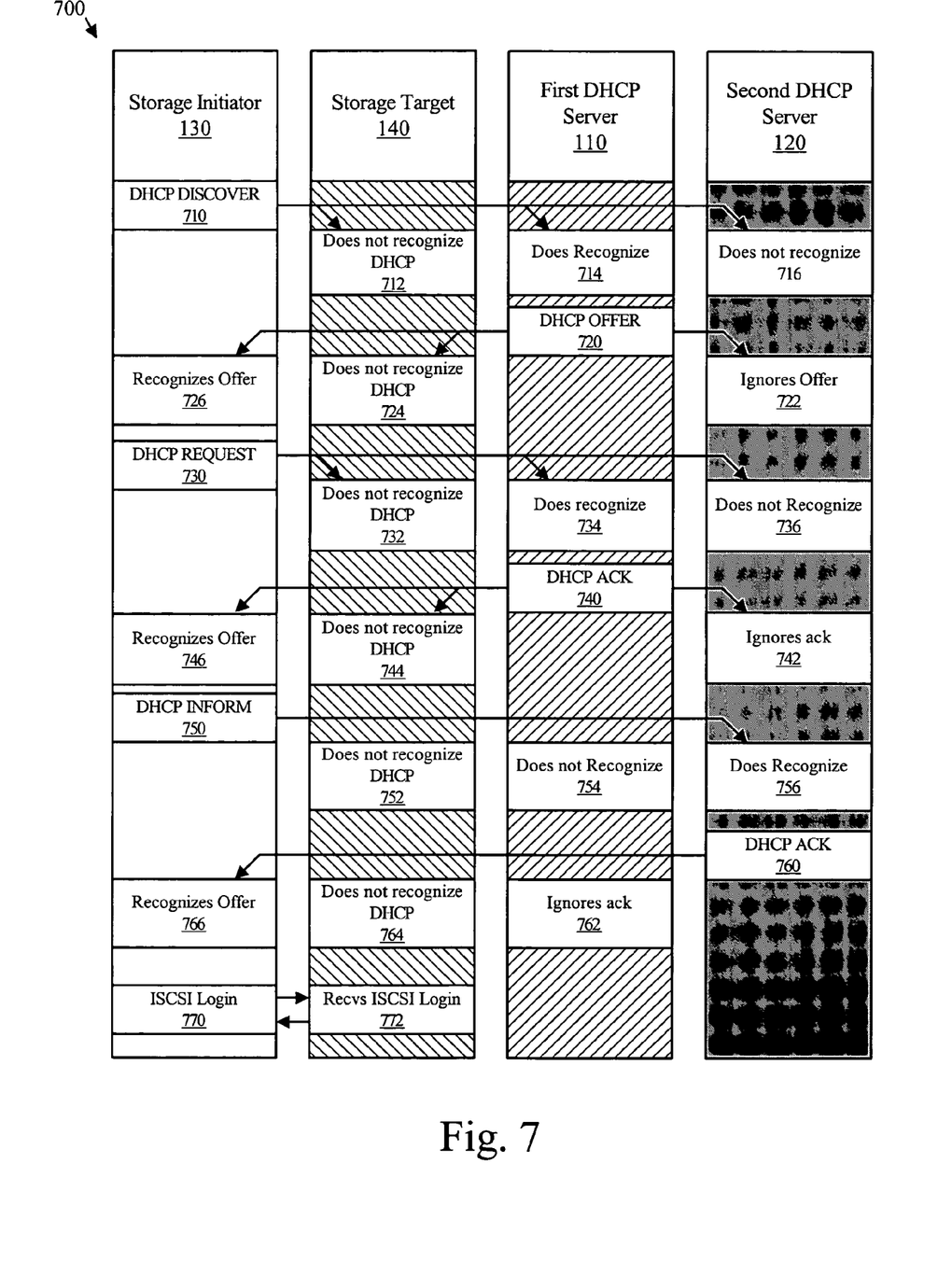
FIG. 7 is a schematic flow diagram illustrating one embodiment of a system communication sequence in accordance with the present invention.

In certain embodiments, the DHCP messages originate from the storage initiators 130 (see FIGS. 4, 5, and 7). In response to receiving a DHCP message from the initiators 130, the first DHCP server 110 may redirect communications regarding configuration parameters for a primary storage device to the second DHCP server 120. In one embodiment, redirection occurs through the first DHCP server 110 indicating to the initiator 130 the particular DHCP server designated for configuration parameter communications and delivery. In response to communications from the initiator 130, the second DHCP server 120 may retrieve configuration parameters from the configuration datastore 122 and communicate the configuration parameters to the appropriate storage initiator 130. Distributing parameters accordingly enables an automated mode of distribution that reduces the time and labor required to distribute configuration parameters.

Each storage initiator 130 may subsequently provide the configuration parameters to the storage target 140 that operates as the primary storage device for that particular initiator 130. The depicted system 100 includes redundant storage initiators 130 as well as redundant storage targets comprising a primary target 140a and a secondary target 140b. In certain embodiments, the system 100 may take on more complex topologies by having additional storage initiators 130 each connected to various storage targets 140 through various networking means and networking pathways. In certain embodiments, some storage initiators 130 may be connected to more storage targets 140 than other storage initiators 130.

The configuration datastore 122 stores configuration parameters for the storage initiators 130 and storage targets 140. In some embodiments, the configuration datastore 122 is a configuration file. In other embodiments, the configuration datastore 122 is a configuration database. In certain embodiments, the configuration datastore 122 indicates the primary and secondary storage devices 140 for the storage initiator 130 as well as the configuration parameters for those devices.

In certain embodiments, a storage initiator 130 retrieves configuration parameters for a secondary storage device 140b in response to unsuccessful configuration of the primary storage device 140a. Providing a primary and secondary storage device enables redundancy and increases system robustness. In certain embodiments, the datastore indicates the appropriate primary or secondary storage devices for the storage initiator 130, such that the storage initiator 130 may communicate the configuration parameters to the appropriate storage target 140.

In the depicted embodiment, the datastore 122 is within the second DHCP server 120. However, the datastore 122 may reside outside the second DHCP server 120. A network may include a large number of datastores 122 for redundancy and/or localized control or a single datastore 122 for centralized control. Providing a configuration parameters datastore 122 enables organized and flexible management of storage device configurations. Such a configuration datastore 122 is especially useful in systems involving tens or hundreds of storage targets 140.

In certain embodiments, the configuration parameters are iSCSI parameters, enabling the storage initiators 130 to implement an iSCSI communication session with the storage targets 140. In such embodiments, the storage initiator 130 may operate as an iSCSI initiator and the storage devices 140 or storage targets 140 operate as iSCSI targets. An iSCSI communication session enables increased control, duration, and storage space with respect to the storage targets 140. The storage targets 140 may be any variety of devices capable of establishing a connection with the storage initiators 130. Accordingly, the system 100 enables various topologies as one storage initiator 130 may control a wide range of local and/or remote storage targets 140.

The depicted system 100 is only one of many topologies enabled by the present invention. For example, in certain embodiments, there may be many DHCP servers, storage initiators, or storage targets. A storage initiator includes any computing device capable of receiving configuration parameters via DHCP and communicating the configuration parameters to a storage target. A storage target may include a primary or secondary storage device capable of receiving and storing configuration parameters.

In some embodiments, the storage initiator 130 may essentially operate as a computer, a host, a server, a storage server, etc. For example, the storage initiator 130 may operate as a storage server, as the storage initiator 130 communicates configuration parameters to the appropriate target 140. The storage initiator 130 may operate as a host computer as the storage initiator 130 communicates with the first or second DHCP server 110, 120 and obtains configuration parameters therefrom. The storage initiator 130 may operate as a storage device or computer. Accordingly, the depicted system 100 is only one embodiment of many possibly embodiments.

Figure 2A:
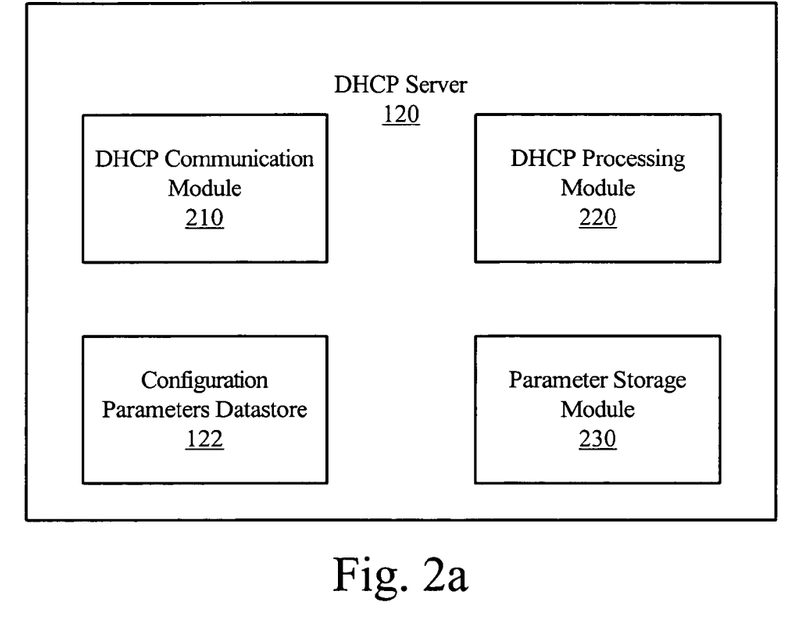
FIG. 2*a* is a schematic block diagram illustrating one embodiment of a parameter distribution server.
Figure 2B:
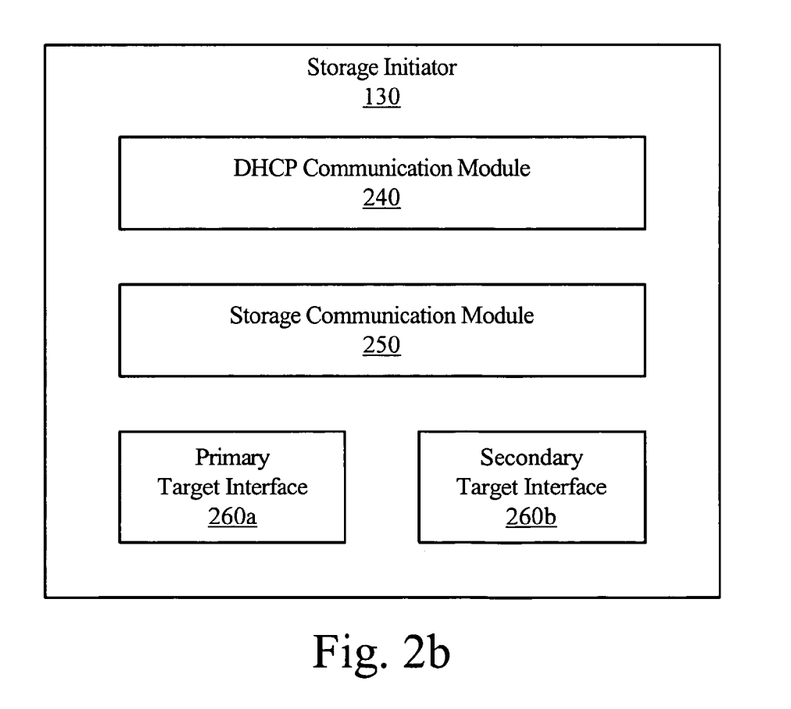
FIG. 2*b* is a schematic block diagram illustrating one embodiment of a storage initiator in accordance with the present invention.

FIG. 2a and 2b are a schematic block diagrams illustrating a DHCP server 120 and storage initiator 130 in accordance with the present invention. The depicted DHCP server 120 corresponds to the second DHCP server 120 of FIG. 1 and includes a configuration parameters datastore 122, a DHCP communication module 210, a DHCP processing module 220, and a parameter storage module 230. The depicted storage initiator 130 corresponds to the storage initiator 130 of FIG. 1 and includes a DHCP communication module 240, a storage communication module 250, a primary target interface 260a, and a secondary target interface 260b. The various components of the DHCP server 120 and storage initiator 130 facilitate parameter distribution.

The DHCP communication module 220 of the DHCP server 120 is configured to conduct DHCP communications as is the DHCP communication module 240 of the storage initiator 130. In certain embodiments, DHCP communications received by the DHPC communication module 220 are processed by the DHCP processing module 220, which is configured to ensure an appropriate response to the storage initiator 130. Some responses include standard DHPC parameters the DHCP processing module 220 retrieves from the parameter storage module 230.

Figure 6:
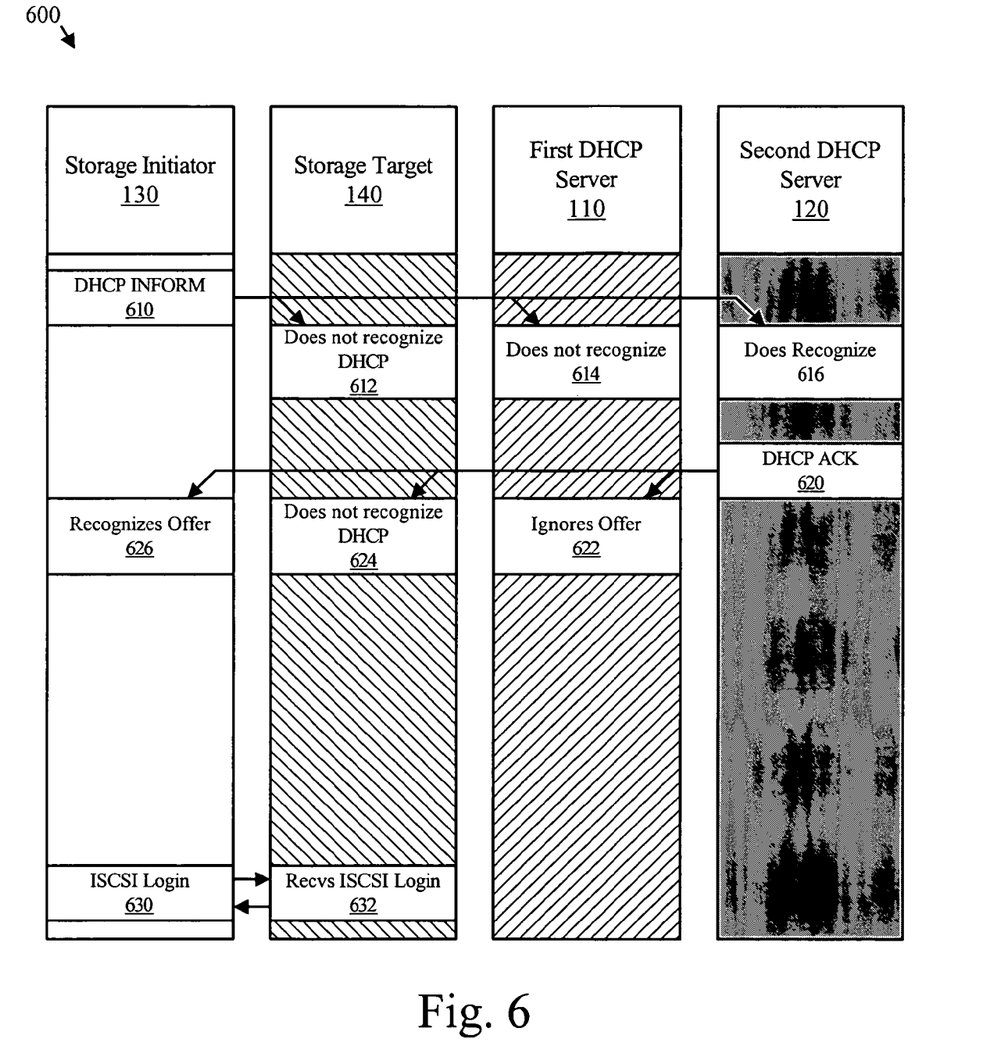
FIG. 6 is a schematic flow diagram illustrating one embodiment of a system communication sequence in accordance with the present invention.

Other responses include retrieving parameters from the configuration parameters datastore 122 (see FIGS. 4-6). In certain embodiments, the parameters stored within the configuration parameters datastore 122 include iSCSI parameters. Accordingly, the DHCP server 120 provides automated communication of non-DHCP parameters via DHCP communications. For example, providing a configuration parameters datastore 122 enables the DHCP server 110 to provide iSCSI parameters to a plurality of storage initiators 130 (see FIG. 1) in an automated fashion. Communicating configuration parameters via DHCP enables an automated mode of parameter distribution.

Once the configuration parameters are communicated from the DHCP server 120 to the storage initiator(s) 130, the storage communication module 250 may then communicate the configuration parameters to a primary or secondary target via the primary target interface 260a or the secondary target interface 260b respectively. In certain embodiments, the storage initiator 130 includes any number of target interface modules depending upon the number of storage devices associated therewith. Accordingly, the depicted storage initiator 130 may function in a great variety of system topologies.

Figure 3:
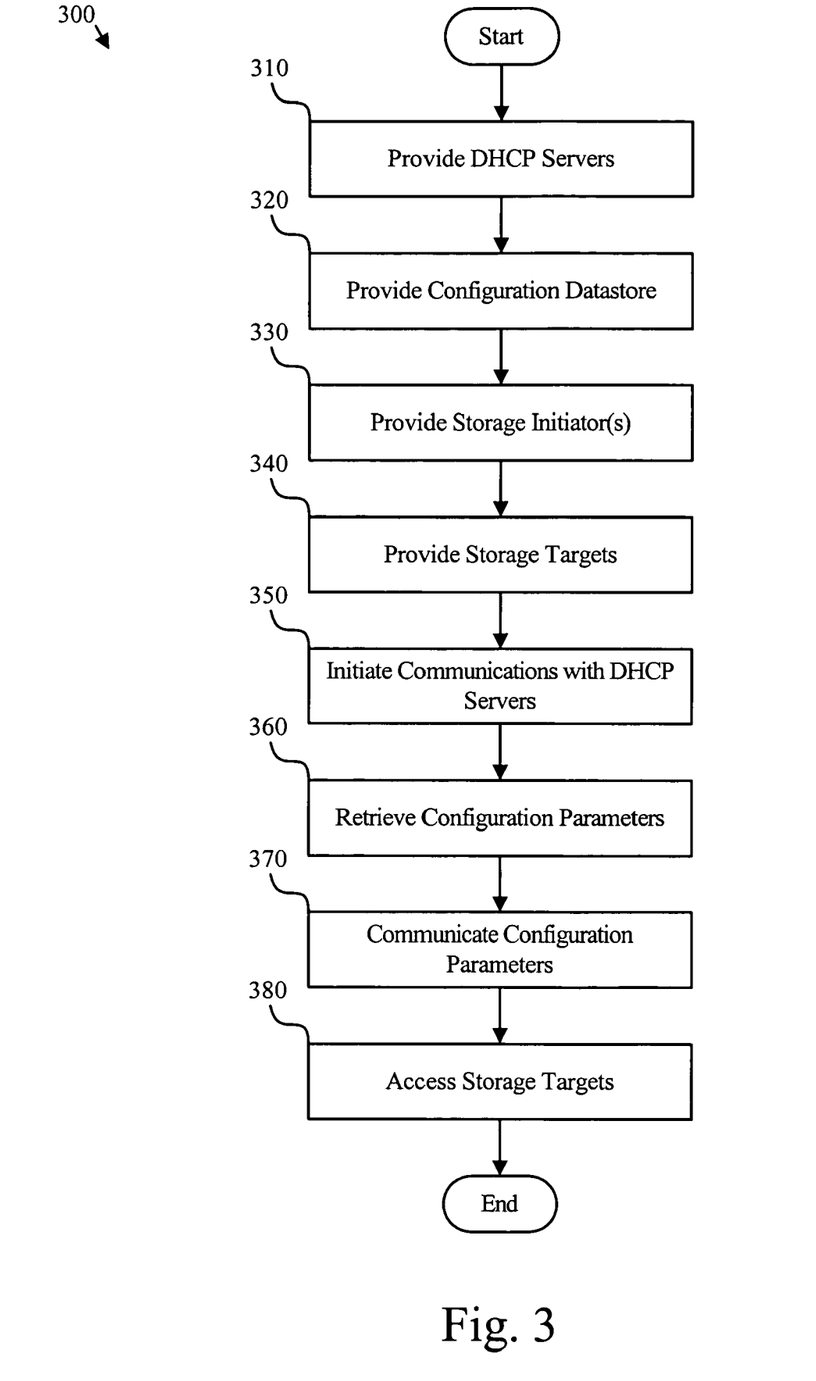
FIG. 3 is a flowchart diagram illustrating one embodiment of a parameter distribution method in accordance with the present invention.

FIG. 3 is a schematic flow chart diagram illustrating of a parameter distribution method. The depicted method 300 includes the operations of providing 310 a DHCP server, providing 320 a configuration parameters datastore, providing 330 one or more storage initiators, providing 340 multiple storage devices, initiating 350 communications with the DHCP server, retrieving 360 configuration parameters from the configuration datastore of configuration parameters, communicating 370 configuration parameters to a storage device, and accessing 380 the storage device. The operations of the depicted method 300 facilitate reception and utilization of configuration parameters.

Providing 310 a DHCP sever includes providing at least one DHCP sever 110 configured to process DHCP messages and redirect configuration related communications to a second DHCP server 120. In one embodiment, redirection occurs by referencing the DHCP server 120.

Providing 320 a configuration datastore includes providing a datastore 122 of configuration parameters for a plurality of devices such as storage initiators 130 and storage targets 140 (see FIG. 1). Accordingly, the present invention teaches a plurality of system topologies. In certain embodiments, the configuration parameters stored within the configuration datastore 122 include iSCSI parameters.

Providing 330 storage initiators includes providing at least one storage initiator (such as the storage initiator 130) capable of communicating with the at least one DHCP server 120 and receiving configuration parameters therefrom. Providing 340 one or more storage targets includes providing storage targets 140 with which at least one storage initiator 130 is capable of communicating with in accordance with parameters subsequently received from the configuration parameters datastore 122.

Initiating 350 communications includes initiating communication between the DHCP 110 server and the at least one storage initiator 130 (see FIG. 1). In certain embodiments, the storage initiator 130 is configured to initiate the communication by broadcasting a DHCP server discovery request. In such embodiments, the DHCP server 110 is configured to receive, process, and respond to the DHCP server discovery request and thereby establish communication between the DHCP server 120 and the storage initiator 130. In certain embodiments, the DHCP server 120 is configured to provide the storage initiator 130 with parameters and instructions to contact an additional DHCP server (see FIG. 1).

Retrieving 360 configuration parameters includes the DHPC sever 120 retrieving configuration parameters from the configuration parameters datastore 122. Communicating 370 the configuration parameters includes communicating the confirmation parameters retrieved by the DHCP server 120 from the configuration parameters datastore to one or more storage initiators 130. Once the storage initiator 130 has received the configuration parameters from the DHCP server 110, the storage initiator 130 may subsequently use the parameters to access 380 storage targets 140 or otherwise establish a connection therewith. Communicating configuration parameters via DHCP provides an automated mode of parameter distribution.

FIG. 4 is a process flow chart diagram illustrating one embodiment of a system communication sequence 400 in accordance with the present invention. The depicted system 400 includes a storage initiator 130, a storage target 140, a second DHCP server 120, and a conventional DHCP server 405. The components of the system 400 communicate with one another to automatically distribute configuration parameters. Different from subsequent illustrations (see FIGS. 5, 6, and 7) the depicted illustration demonstrates an embodiment wherein second DHCP server 120 also provides the functionality of a first DHCP server 110 and responds accordingly.

The storage initiator 130 issues a DHCP discover request 410 capable of determining an appropriate DHCP server from which to obtain DHCP parameters. Accordingly, the storage target 140 and conventional DHCP server 405 do not recognize the DHCP discover request 412, 414. However, the second DHCP server 120 does recognize the request 416. In certain embodiments, recognition of the DHCP discover request may identify the appropriate DHCP server by implementing a key that only the appropriate server will recognize. Communicating via DHCP provides an automated mode of parameter distribution.

Once the second DHCP server 120 has received and recognized the DHCP discover request 416, the second DHCP server 120 may issue a DHCP offer 420 to notify the storage initiator 130 of the existence and availability of the second DHCP server 120. The conventional DHCP server 405 ignores 422 the DHCP offer 422 while the storage target 140 does not recognize the DHCP offer 424. Selectively communicating the DHCP offer to the storage initiator 130 may be accomplished by standard networking protocols and procedures.

As the storage initiator 130 receives and recognizes the DHCP offer 426, the storage initiator 130 then issues a DHCP request 430. The storage target 140 and conventional DHCP server 405 ignore the DHCP request 432, 434. However, the second DHCP server 120 recognizes the DHCP request 436. In response, the second DHCP server 120 retrieves configuration parameters from a configuration parameters datastore 122 (See FIG. 1) and issues a DHCP acknowledgement 440 which contains the appropriate configuration parameters. In the illustrated embodiment, at least some of the configuration parameters include iSCSI parameters.

The conventional DHCP server 405 ignores 443 the DHCP acknowledgement 440 and the storage target 140 does not recognize the DHCP acknowledgement 440. However, the storage initiator 130 does recognize 446 the DHCP acknowledgement 440 and receives the configuration parameters contained therein. The iSCSI parameters within the DHCP acknowledgment 440 enable the storage initiator 130 to establish an iSCSI connection with the storage target 140 by issuing an iSCSI login 450 and having the iSCSI login received 452.

FIG. 5 is a process flow diagram illustrating one embodiment of a system communication sequence 500 in accordance with the present invention. Similar to FIG. 4, the depicted system communication sequence 550 includes a storage initiator 130, a storage target 140, a second DHCP server 120, and a first DHCP server 110. In contrast to the system depicted in FIG. 4, the system 500 depicted in FIG. 5 illustrates the storage initiator 130 obtaining communication parameters from the first DHCP server 110 and the second DHCP server 120.

The storage initiator 130 broadcasts a DHCP discover request 510 which is recognized by the first DHCP server 514, but not the storage target 512 or the first DHCP server 516. In certain embodiments, recognition of the DHCP discover request 510 depends upon a code, sequence, or value within the communication. In response to recognizing the DHCP discover request 510, the first DHCP server 110 issues a DHCP offer 520. The offer 520 is ignored 522 by the second DHCP server 120 and unrecognized 524 by the storage target 140. However, the storage initiator 130 recognizes 526 the DHCP offer 520.

As the storage initiator 130 is aware of the first DHCP server 110, the storage initiator 130 issues a DHCP request 530 that may include a request for configuration parameters such as DHCP parameters. The DHCP request 530 is not recognized by either the storage target 532 or the second DHCP server 536. The first DHCP server 110 does recognize the DHCP request 534, and issues a DHCP acknowledgement 540 in return. The DHCP acknowledgement 540 is recognized by the storage initiator 546, but ignored by the second DHCP server 542 and unrecognized by the storage target 544. In the depicted embodiment, the DHCP acknowledgement 540 includes instructions for obtaining parameters from the second DHCP server 120.

The storage initiator 130 broadcasts a DHCP inform message 550 that is not recognized by the storage device 552 or the first DHCP server 554 as the second DHCP server 120 is the DHCP server indicated in the message. A DHCP inform message may include a request for parameters that will enable the storage initiator 130 to communicate with the storage target 140. The second DHCP server 120 recognizes 556 the DHCP inform message 550 and issues a DHCP acknowledgement 560 in response. The DHCP acknowledgment 560 of the second DHCP server 120 is recognized 566 by the storage initiator 130, but ignored 562 by the second DHCP server 120 and not recognized 564 by the storage target 140.

The DHCP acknowledgment message 560 of the second DHCP server 120 includes configuration parameters from a configuration parameters datastore which includes iSCSI parameters for establishing iSCSI connection with the storage target 140. Accordingly, the storage initiator 130 attempts an iSCSI login 570 with the storage target 140. The login attempt 570 is received and accepted 572 by the storage target 140. Accordingly, the depicted system provides an automated way for distributing configuration parameters.

FIG. 6 is a process flow diagram illustrating one embodiment of a system communication sequence 600 in accordance with the present invention. Similar to FIGS. 4 and 5, the depicted system communication sequence 600 includes a storage initiator 130, a storage target 140, a second DHCP server 120, and a first DHCP server 110. In contrast to FIGS. 4 and 5, the depicted system communication sequence illustrates the storage initiator 130 obtaining configuration parameters from the second DHCP server 120 while the system is already running. In other words, FIG. 6 teaches an operation for obtaining additional configuration parameters from the second DHCP server 110 without having to begin with a DHCP discover request as depicted in FIGS. 4 and 5.

The storage initiator 130 broadcasts a DHCP inform message 610 that is not recognized by the storage target 612 and is not recognized 614 by the first DHCP 110. However, the DHCP inform message 610 is recognized 616 by the second DHCP server 120. In certain embodiments, the DHCP inform message 610 includes a request for the parameters necessary to subsequently establish an iSCSI connection with the storage target 140.

In response to the DHCP inform message 610, the first DHCP server 110 issues a DHCP acknowledgement 620 that is ignored by the second DHCP server 622 and not recognized by the storage device 624. The storage initiator 130, however, does recognize the DHCP acknowledgement 626. The DHCP acknowledgement 620 includes the configuration parameters necessary for the storage device to initiate an iSCSI login 630 that is received 632 by the storage device. Accordingly, the depicted system communication sequence 600, teaches a way to obtain configuration parameters from the second DHCP server 120 and later establish an iSCSI connection with the storage target 140 without involving certain steps illustrated in FIGS. 4 and 5.

FIG. 7 is a process flow diagram illustrating one embodiment of a system communication sequence 700 in accordance with the present invention. Similar to FIG. 5, the depicted system communication sequence 700 includes a storage initiator 130, a storage target 140, a second DHCP server 120, and a first DHCP server 110. In contrast to the system in FIG. 5, the system 700 depicted in FIG. 7 illustrates the storage initiator 130 communicating with the second DHCP server 120 via a unicast DHCP inform message 750.

The storage initiator 130 broadcasts a DHCP discover request 710 which is recognized by the first DHCP server 714, but not the storage device 712 or the second DHCP server 716. In certain embodiments, recognition of the DHCP discover request 710 depends upon a code, sequence, or value. In response to recognizing the DHCP discover request 710, the first DHCP server 110 issues a DHCP offer 720. The offer 720 is ignored 722 by the second DHCP server 722 and unrecognized 724 by the storage target 140. However, the storage initiator 130 recognizes 726 the DHCP offer 720.

As the storage initiator 130 is aware of the first DHCP server 110, the storage initiator 130 issues a DHCP request 730 that may include a request for configuration parameters such as DHCP parameters. The DHCP request 730 is not recognized by either the storage device 732 or the second DHCP server 736. The first DHCP server 110 does recognize the DHCP request 734, and issues a DHCP acknowledgement 740 in return. The DHCP acknowledgement 740 is recognized by the storage initiator 746, but ignored by the second DHCP server 742 and unrecognized by the storage target 744. In the depicted embodiment, the DHCP acknowledgement 740 includes instructions for obtaining parameters from the first DHCP server 110. The DHCP acknowledgment 740 includes instructions for creating a unicast DHCP inform message, such that the storage initiator 130 communicates directly to the second DHCP server 120 instead of broadcasting to every device in the system 700.

The storage initiator 130 broadcasts a DHCP inform message 750 that is not recognized by the storage device 752 or the second DHCP server 754 as the first DHCP server 120 is the message indicated DHCP server. A DHCP inform message may include a request for parameters that will enable the storage initiator 130 to communicate with the storage target 140. The first DHCP server 110 recognizes 756 the DHCP inform message 750 and issues a DHCP acknowledgement 760 in response. The DHCP acknowledgment 760 of the first DHCP server 110 is recognized 766 by the storage initiator 130, but ignored 762 by the second DHCP server 120 and not recognized 140 by the storage target 140.

The DHCP acknowledgment message 760 of the first DHCP server 110 includes configuration parameters from a configuration parameters datastore 122 (See FIG. 1) which include iSCSI parameters for establishing an iSCSI connection with the storage target 140. Accordingly, the storage initiator 130 attempts an iSCSI login 570 with the storage target 140. The login attempt 770 is received and accepted 572 by the storage device. Accordingly, the depicted system provides an automated way for distribution and utilization of configuration parameters.

The present invention provides for flexible automated delivery of configuration parameters. By redirecting communications from a first to a second DHCP server a variety of network topologies may be supported. For example, the first DHCP server may be a local server that redirects communication to a centralized second DHCP server to facilitate centralized control and delivery. Alternately the first DHCP server may be a centralized server that indicates an appropriate DCHP server for an initiator to communicate with in order to retrieve configuration parameters. Additionally, the ability to specify redundant targets for each initiator in the configuration datastore enables an initiator to recover from unsuccessful initialization of a primary storage target and initialize an appropriate secondary storage target.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium tangibly embodying a program of machine-readable instructions executable by a digital processing apparatus to perform operations for distributing configuration parameters to storage devices, the operations comprising:
    communicating with a first Dynamic Host Configuration Protocol ("DHCP") server configured to process DHCP messages;
    receiving one or more DHCP responses from the first DHCP server, the one or more DHCP responses comprising DHCP configuration parameters, and an indication of a second DHCP server designated for non-DHCP configuration parameters communication;
    directing communications regarding non-DHCP configuration parameters to the second DHCP server in response to receiving the indication of the second DHCP server from the first DHCP server, wherein the non-DHCP configuration parameters are Internet Small Computer System Interface ("iSCSI") parameters;
    receiving a response, in a DHCP message, comprising non-DHCP configuration parameters for a primary storage device from the second DHCP server; and
    providing the non-DHCP configuration parameters to the primary storage device.

2. The non-transitory computer readable storage medium of claim 1, wherein the operations further comprise retrieving non-DHCP configuration parameters for a secondary storage device and providing the non-DHCP configuration parameters to the secondary storage device in response to unsuccessful configuration of the primary storage device, the primary storage device and the secondary storage device comprising distinct storage devices.

3. The non-transitory computer readable storage medium of claim 1, wherein the operations further comprise accessing a configuration datastore to discover the primary and secondary storage devices.

4. The non-transitory computer readable storage medium of claim 1, wherein the operations further comprise operating the digital processing apparatus as an iSCSI initiator.

5. A system for distributing configuration parameters to storage devices, the system comprising:
    a primary hardware storage device configured to store data and configured to receive one or more Dynamic Host Configuration Protocol ("DHCP") responses from a first hardware DHCP server, the one or more DHCP responses comprising DHCP configuration parameters and an indication of a second hardware DHCP server designated for non-DHCP configuration parameters communication;
    the first hardware DHCP server configured to process DHCP messages and communicate DHCP configuration parameters to the primary hardware storage device, the first hardware DHCP server configured to send the one or more DHCP responses to the primary hardware storage device to indicate the second hardware DHCP server is designated for communications regarding non-DHCP configuration parameters, wherein the non-DHCP configuration parameters are Internet Small Computer System Interface ("iSCSI") parameters;
    a configuration datastore configured to store non-DHCP configuration parameters for a plurality of storage devices; and
    the second hardware DHCP server configured to process DHCP messages regarding non-DHCP configuration parameters responding to receiving a DHCP message directed from the primary hardware storage device and retrieve, in one or more DHCP messages, the non-DHCP configuration parameters for the plurality of storage devices from the configuration datastore and provide the non-DHCP configuration parameters to the primary hardware storage device.

6. The system of claim 5, further comprising a storage initiator configured to retrieve the non-DHCP configuration parameters for the primary storage device from the second DHCP server and provide the non-DHCP configuration parameters to the primary storage device.

7. The system of claim 6, further comprising a secondary storage device configured to store data.

8. The system of claim 6, wherein the storage initiator is further configured to operate as an iSCSI initiator.

9. The system of claim 7, wherein the storage initiator is further configured to retrieve non-DHCP configuration parameters for the secondary storage device and provide the non-DHCP configuration parameters to the secondary storage device in response to unsuccessful configuration of the primary storage device, the primary storage device and the secondary storage device comprising distinct storage devices.

10. The system of claim 7, wherein the configuration datastore is further configured to indicate the primary and secondary storage devices for the storage initiator.

11. The system of claim 5, wherein primary storage device is further configured to operate as an iSCSI target.

12. The system of claim 5, wherein the configuration datastore comprises a configuration file.

13. The system of claim 5, wherein the configuration datastore comprises a configuration database.

14. An apparatus for distributing configuration parameters to storage devices, the apparatus comprising:
    a Dynamic Host Configuration Protocol ("DHCP") communication module configured to communicate with a first DHCP server;
    the DHCP communication module further configured to receive one or more DHCP responses from the first DHCP server comprising DHCP configuration parameters, and an indication of a second DHCP server designated for non-DHCP configuration parameters communication;

the DHCP communication module further configured to direct communications regarding non-DHCP configuration parameters to the second DHCP server in response to receiving the indication of the second DHCP server from the first DHCP server, wherein the non-DHCP configuration parameters are Internet Small Computer System Interface ("iSCSI") parameters; and a storage interface module configured to receive a response, in a DHCP message, comprising non-DHCP configuration parameters for a secondary storage device provided by the second DHCP server and provide the non-DHCP configuration parameters to the secondary storage device, wherein all or a portion of the DHCP communication module and the storage interface module comprise one or more of logic hardware and executable code, the executable code stored on one or more non-transitory computer readable storage media.

15. The apparatus of claim 14, wherein the DHCP communication module is further configured to retrieve non-DHCP configuration parameters for a secondary storage device from the second DHCP server and provide the non-DHCP configuration parameters to the secondary storage device in response to unsuccessful configuration of a primary storage device.

16. A method to distribute configuration parameters to storage devices, the method comprising:

configuring a first Dynamic Host Configuration Protocol ("DHCP") server to communicate, in one or more DHCP responses, DHCP configuration parameters and an indication of a second DHCP server designated for non-DHCP configuration parameters communications, wherein the non-DHCP configuration parameters are Internet Small Computer System Interface ("iSCSI") parameters;

configuring a storage initiator to direct DHCP message regarding non-DHCP configuration parameters to the second DHCP server in response to receiving the indication of the second DHCP server from the first DHCP server;

configuring the second DHCP server to retrieve non-DHCP configuration parameters for a plurality of storage devices from a configuration datastore responding to receiving the DHCP message directed from the storage initiator, and to provide the non-DHCP configuration parameters to the storage initiator; and configuring the storage initiator to retrieve, using one or more DHCP messages, the DHCP configuration parameters for a primary storage device sent from the first DHCP server and the non-DHCP configuration parameters for the primary storage device sent from the second DHCP server, and to provide the non-DHCP configuration parameters to a primary storage device.

17. The method of claim 16, further comprising configuring the storage initiator to retrieve non-DHCP configuration parameters for a secondary storage device and provide the non-DHCP configuration parameters to the secondary storage device in response to unsuccessful configuration of the primary storage device, the primary storage device and the secondary storage device comprising distinct storage devices.

* * * * *